(12) United States Patent
Hirata et al.

(10) Patent No.: US 7,663,845 B2
(45) Date of Patent: Feb. 16, 2010

(54) CURRENT-PERPENDICULAR-TO-PLANE MAGNETO-RESISTIVE ELEMENT INCLUDING MULTILAYER LOWER MAGNETIC SHIELDING FILM

(75) Inventors: Kei Hirata, Tokyo (JP); Koji Shimazawa, Tokyo (JP); Atsushi Yamaguchi, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 405 days.

(21) Appl. No.: 11/616,503

(22) Filed: Dec. 27, 2006

(65) Prior Publication Data

US 2007/0211391 A1  Sep. 13, 2007

(30) Foreign Application Priority Data

Mar. 7, 2006  (JP) ............................. 2006-061076

(51) Int. Cl.
*G11B 5/11* (2006.01)
*G11B 5/39* (2006.01)

(52) U.S. Cl. ..................................................... 360/319

(58) Field of Classification Search ................. 360/319, 360/322, 324.1, 324.11, 324.12, 324.2
See application file for complete search history.

(56) References Cited

U.S. PATENT DOCUMENTS

| | | | |
|---|---|---|---|
| 6,275,360 B1 * | 8/2001 | Nakamoto et al. | 360/319 |
| 6,515,837 B1 * | 2/2003 | Hamakawa et al. | 360/319 |
| 2003/0206379 A1 * | 11/2003 | Lin et al. | 360/319 |
| 2007/0035886 A1 * | 2/2007 | Kagami et al. | 360/319 |
| 2007/0242391 A1 * | 10/2007 | Yamaguchi et al. | 360/319 |
| 2008/0285180 A1 * | 11/2008 | Tanaka et al. | 360/319 |
| 2009/0161268 A1 * | 6/2009 | Lin | 360/324.11 |

FOREIGN PATENT DOCUMENTS

| | | | |
|---|---|---|---|
| JP | 61258323 A | * | 11/1986 |
| JP | 2003-17781 | | 1/2003 |

OTHER PUBLICATIONS

U.S. Appl. No. 11/856,438, filed Sep. 17, 2007, Shimazawa, et al.
U.S. Appl. No. 11/623,493, filed Jan. 16, 2007, Yamaguchi, et al.
U.S. Appl. No. 11/946,358, filed Nov. 28, 2007, Shimazawa, et al.

* cited by examiner

*Primary Examiner*—Jefferson Evans
(74) *Attorney, Agent, or Firm*—Oblon, Spivak, McClelland, Maier & Neustadt, L.L.P.

(57) ABSTRACT

A current-perpendicular-to-plane magneto-resistive element includes a magneto-resistive film and a pair of upper and lower magnetic shielding films holding the magneto-resistive film therebetween for current feeding. The lower magnetic shielding film has an at least two-layer structure including a crystalline material layer and an amorphous material layer disposed below the crystalline material layer.

12 Claims, 3 Drawing Sheets

CURRENT-PERPENDICULAR-TO-PLANE MAGNETO-RESISTIVE ELEMENT INCLUDING MULTILAYER LOWER MAGNETIC SHIELDING FILM

BACKGROUND OF THE INVENTION

1. Field of the Invention

The present invention relates to a current-perpendicular-to-plane (CPP) magneto-resistive element in which currents are fed in a direction perpendicular to a film plane, such as CPP giant magneto-resistive (GMR) element and tunneling magneto-resistive (TMR) element.

2. Description of the Related Art

Magneto-resistive elements have been used, for example, in the field of magnetic recording as a read element for reading recorded data from a magnetic recording medium. Reading of magnetic data can be performed by feeding a sense current to a magneto-resistive film through a prescribed current feeding structure and detecting change in sense current corresponding to change in resistance depending on external magnetic field.

CPP (current-perpendicular-to-plane) type has been known as one current feeding structure for feeding a sense current to a magneto-resistive element. In the CPP type, magnetic shielding films are disposed to hold a magneto-resistive film therebetween in a vertical direction perpendicular to the film plane and a sense current is fed to the magneto-resistive film through the magnetic shielding films (as disclosed in Japanese Unexamined Patent Application Publication No. 2003-17781).

In magneto-resistive elements, the MR ratio can be dramatically improved by using a half-metallic material with high spin polarizability (as exemplified by Heusler alloy) for a free layer or a pinned layer and using MgO as a crystalline material for a barrier layer. In order to improve the MR ratio as above, furthermore, it is required to perform high-temperature annealing at a temperature equal to or greater than 300° C.

In CPP magneto-resistive elements, however, high-temperature annealing at a temperature equal to or greater than 300° C. may grow crystal grains within the magnetic shielding film, decreasing the magnetic permeability, which impairs the magnetic shielding effect.

SUMMARY OF THE INVENTION

It is an object of the present invention to provide a CPP magneto-resistive element which can avoid deterioration in shielding effect of a magnetic shielding film while improving MR ratio.

According to the present invention, there is provided a CPP magneto-resistive element comprising:

a magneto-resistive film; and a pair of upper and lower magnetic shielding films holding the magneto-resistive film therebetween for current feeding, wherein the lower magnetic shielding film has an at least two-layer structure including a crystalline material layer and an amorphous material layer disposed below the crystalline material layer.

Preferably, a crystalline material of the crystalline material layer has a grain size of 90 nm to 850 nm.

Preferably, the amorphous material layer has a film thickness as large as one-quarter to three-quarters of a film thickness of the lower magnetic shielding film.

Preferably, a crystalline material of the crystalline material layer is constituted of at least one element selected from the group consisting of Fe, Ni and Co and contains at least C, S and B as trace elements, while an amorphous material (a non-crystalline material) of the amorphous material layer is a magnetic material and constituted of at least one element selected from the group consisting of Co, Fe, Zr, Ta, Mo, Ni, Cu, Si, Hf, Nb, W, Cr, Al, P, V, C, B, O and N.

Preferably, a crystalline material of the crystalline material layer is either $Ni_xFe_{(1-x)}$ (75<x<85[at.%]) or $Co_yFe_{(1-y)}$ (5<y<15[at.%]).

The present invention also provides a magnetic head and a magnetic recording/reproducing apparatus.

The magnetic head of the present invention includes the above CPP magneto-resistive element as a read element.

The magnetic recording/reproducing apparatus of the present Inv ention includes the above magnetic head and a magnetic recording medium.

According to the present invention, deterioration in shielding effect of a magnetic shielding film can be avoided while improving MR ratio.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
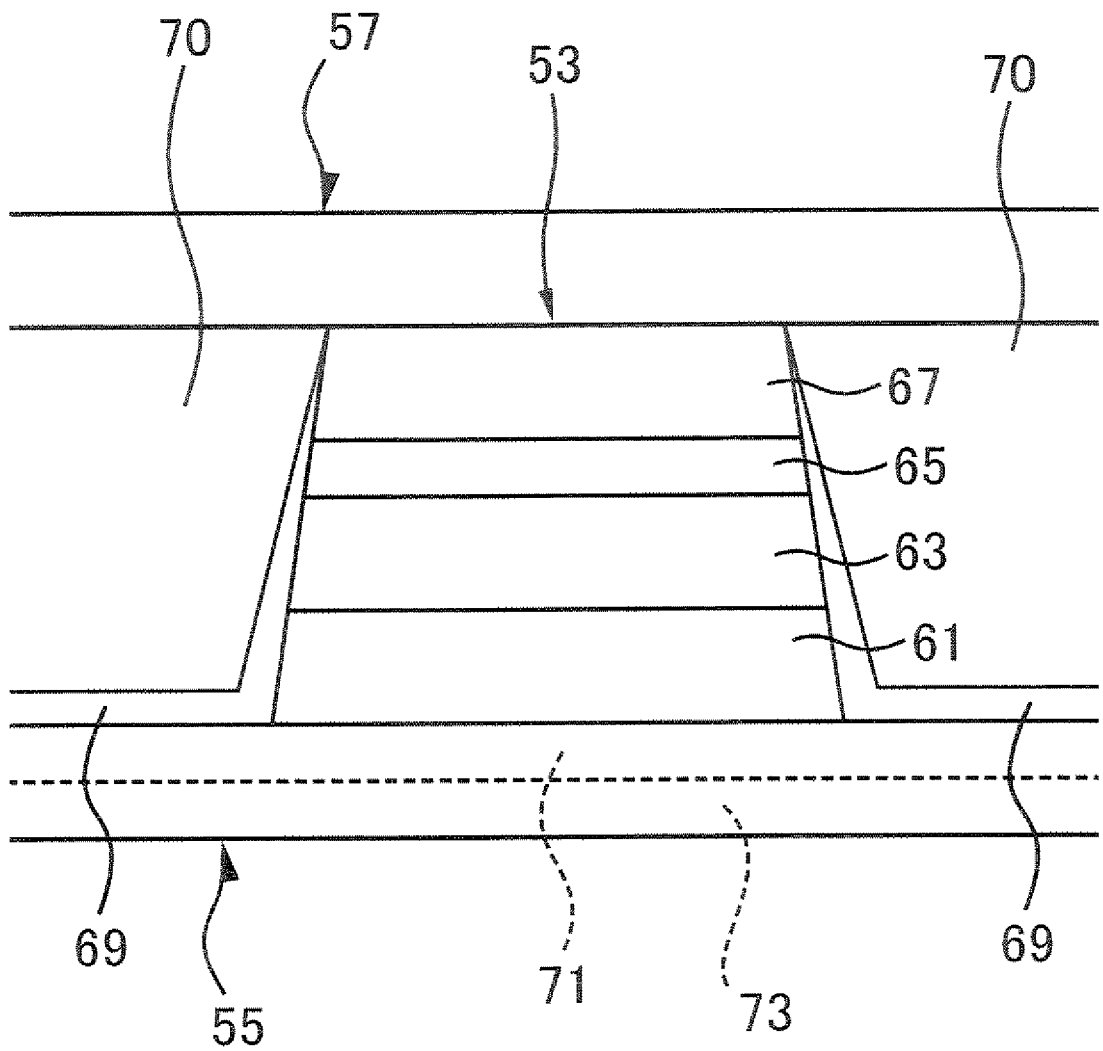
FIG. 1 is a diagram schematically showing a structure of a CPP magneto-resistive element according to one embodiment of the present invention.

Hereinbelow, preferred embodiments of the CPP magneto-resistive element according to the present invention, as well as the magnetic head and the magnetic recording/reproducing apparatus using the same, will be described with reference the accompanying drawings. It should be noted that in the drawings, the same or corresponding portions are denoted by the same reference numerals. Throughout the description, the terms "upper" and "lower" refer to a positional relation between two layers in a lamination direction from a substrate, wherein a "lower" layer is deposited prior to an "upper" layer.

FIG. 1 schematically shows a structure of a CPP magneto-resistive element 51 (which is a CPP-GMR element). The CPP magneto-resistive element 51 comprises a magneto-resistive film 53 and a pair of magnetic shielding films 55 and 57 disposed above and below the magneto-resistive film 53 for current feeding. The magneto-resistive film 53 comprises an antiferromagnetic layer 61, a pinned layer 63, a non-magnetic layer 65 and a free layer 67. On both sides of the magneto-resistive film 53, there are disposed an insulation layer 69 and a bias layer 70.

The direction of magnetization of the pinned layer 63 is pinned in one direction by exchange coupling between the pinned layer 63 and the antiferromagnetic layer 61, which is disposed on the side opposite to the non-magnetic layer 65. On the other hand, the direction of magnetization of the free layer 67 is allowed to change depending on external magnetic field such as a magnetic flux from a recording medium.

Next will be described constituent materials of the individual layers in the present embodiment. The antiferromagnetic layer 61 may be constituted of IrMn. The pinned layer 63 may have a so-called synthetic pinned structure, i.e., a multilayer structure, in which a first CoFe layer, a Ru layer, a second CoFe layer, and a CoMnSi (Heusler alloy) layer are sequentially deposited from bottom to top. The non-magnetic layer 65 may be constituted of Cu. The free layer 67 may have a multilayer structure in which a first CoFe layer, a NiFe layer, and a second CoFe layer are sequentially deposited from bottom to top. Here, the free layer 67 may contain a Heusler alloy layer.

The lower magnetic shielding film 55 disposed below the magneto-resistive film 53 with respect to the lamination direction has an at least two-layer structure, i.e., includes a crystalline material layer 71 and an amorphous material layer 73. It should be noted that the constituent material of the amorphous material layer 73 is not limited to an amorphous material in the proper sense of the word, but may include a fine crystalline material having a grain size equal to or less than 10 nm.

The constituent materials of these layers may be as follows: the crystalline material of the crystalline material layer is constituted of at least one element selected from the group consisting of Fe, Ni and Co and contains at least C, S and B as trace elements; the amorphous material of the amorphous material layer is a magnetic material and constituted of at least one element selected from the group consisting of Co, Fe, Zr, Ta, Mo, Ni, Cu, Si, Hf, Nb, W, Cr, Al, P, V, C, B, O and N.

Preferably, the crystalline material of the crystalline material layer 71 is either $Ni_xFe_{(1-x)}$ (75<x<85[at.%]) or $Co_yFe_{(1-y)}$ (5<y<15[at.%]). In addition, the crystalline material of the crystalline material layer 71 may have a grain size of 90 nm to 850 nm.

Moreover, the amorphous material layer 73 may have a film thickness as large as one-quarter to three-quarters of a film thickness of the lower magnetic shielding film 55.

In the present embodiment, the upper magnetic shielding film 57 may be constituted as in the prior art without particular limitations.

Next will be described a method for manufacturing a CPP magneto-resistive element having the above structure. Since the process prior to formation of the lower magnetic shielding film 55 may be similar to the known process, its description will be omitted. The formation of the lower magnetic shielding film 55 starts with deposition of the amorphous material layer 73 as a constituent layer. The amorphous material layer 73 may be formed by sputtering or plating. Subsequently, the crystalline material layer 71 is deposited above the amorphous material layer 73 with respect to the lamination direction. The crystalline material layer 71 may be formed by sputtering or plating.

Above the thus-formed lower magnetic shielding film 55 with respect to the lamination direction, there is formed the magneto-resistive film 53. Specifically, the antiferromagnetic layer 61 is first formed, and then, the pinned layer 63, the non-magnetic layer 65, the free layer 67 and a cap layer (not shown) are formed in order. Here it is preferable to form a suitable foundation layer on the lower magnetic shielding film 55 prior to the formation of the antiferromagnetic layer 61.

Subsequently, high-temperature annealing is performed at a temperature equal to or greater than 300° C., preferably in the range of 320° C. to 360° C. This is because CoMnSi, which is used to constitute one layer of the pinned layer 63, can be ordered by the high-temperature annealing into a half-metal with high polarizability, dramatically improving the MR ratio.

Then, patterning of the magneto-resistive film 53 is performed. In more detail, the magneto-resistive film 53 may be patterned as shown in FIG. 1 in such a manner that a masking device is disposed above the free layer 67 constituting the magneto-resistive film 53 and unnecessary parts of the antiferromagnetic layer 61, the pinned layer 63, the non-magnetic layer 65 and the free layer 67 are removed such as by etching.

Thereafter, the insulation layer 69 and the bias layer 70 are formed on both sides of the magneto-resistive film 53 where unnecessary parts are removed by etching. Then, the upper magnetic shielding film 57 is formed above the magneto-resistive film 53 and the bias layer 70 to obtain the structure shown in FIG. 1. It should be noted that the high-temperature annealing may be performed at any time after the formation of the CoMnSi layer (or MgO layer). For example, it may be performed after the formation of the insulation layer 69.

Here, the high-temperature annealing, which can dramatically improve the MR ratio of the magneto-resistive element as described above, may affect a magnetic shielding film, i.e., the lower magnetic shielding film that must be provided prior to the formation of the magneto-resistive film.

In this regard, for example, in case of conventional soft magnetic magnetic-shielding films constituted of a crystalline material such as NiFe and CoFe, the high-temperature annealing considerably accelerates the growth of crystal grains within the magnetic shielding film, deteriorating the soft magnetic characteristic and decreasing the magnetic permeability, which impairs the magnetic shielding effect. In this regard, the present inventors have also studied the use of an amorphous material (a Co-alloy such as CoZrTa and CoMoTa; a Fe-alloy such as FeTaC) or a fine crystalline material (a hetero-granular material such as Fe—ZrO2 and FeCo—HfO; FeSiB) as a material that will not deteriorate in soft magnetic characteristic upon the high-temperature annealing, in place of crystalline materials constituting the conventional magnetic shielding films. However, these materials have high resistivity and therefore may cause a new problem of increasing the parasitic resistance in CPP magneto-resistive elements in which the shield also serves as an electrode. That is, it has been found that suppressing a decrease in the magnetic shielding effect is in a conflicting relationship with suppressing an increase in the parasitic resistance.

In the CPP magneto-resistive element according to one embodiment of the present invention, on the other hand, the lower magnetic shielding film 55 has a two-layer structure, particularly including the amorphous material layer 73 as a lower layer and the crystalline material layer 71 as an upper layer. This suppresses the grain growth of the crystalline material within the lower magnetic shielding film 55 during the high-temperature annealing, ensuring sufficient shielding effect. In addition, since the high-temperature annealing provides proper grain growth of the crystalline material within the crystalline material layer 71, a highly resistive grain boundary decreases in the shield, which achieves a decrease in the parasitic resistance at the electrodes while suppressing a decrease in the magnetic shielding effect.

In the present embodiment, additionally, the crystalline material of the crystalline material layer 71 may have a grain size of 90 nm to 850 nm. In this regard, the inventors' study has revealed that: if the grains size is less than 90 nm, there is a high possibility that the crystal grain boundary will be located immediately beneath the magneto-resistive element, thereby increasing the parasitic resistance; if the grain size is greater than 850 nm, on the other hand, there is a possibility that the effect of magnetic crystalline anisotropy will become predominant, thereby decreasing the magnetic permeability. In the present embodiment, accordingly, these possibilities can be eliminated by setting the grain size within the above range.

In the present embodiment, moreover, the amorphous material layer 73 may have a film thickness as large as one-quarter to three-quarters of a film thickness of the lower magnetic shielding film 55. In this regard, the inventors' study has revealed that: if it is less than one-quarter, there is a possibility that the grain growth of the crystalline material will cause a decrease in the overall shielding effect; if it greater than three-quarters, on the other hand, there is a possibility that the highly resistive amorphous material will increase the parasitic resistance. In the present embodiment, accordingly, these possibilities can be eliminated by setting the film thickness within the above range.

In the present embodiment, furthermore, the crystalline material of the crystalline material layer 71 may be constituted of at least one element selected from the group consisting of Fe, Ni and Co and contain at least C, S and B as trace elements; the amorphous material of the amorphous material layer 73 may be constituted of at least one element selected from the group consisting of Co, Fe, Zr, Ta, Mo, Ni, Cu, Si, Hf, Nb, W, Cr, Al, P, V, C, B, O and N, wherein a reproducing head can be inhibited from causing noise or output fluctuation due to stress-induced change in magnetic domain structure of the shield by setting the magnetostriction constant λ of the amorphous material within the range of $-3 \times 10^{-6} < \lambda < 3 \times 10^{-6}$.

In the present embodiment, still furthermore, the crystalline material of the crystalline material layer 71 may be either $Ni_xFe_{(1-x)}$(75<x<85[at.%]) or $Co_yFe_{(1-y)}$(5<y<15[at.%]). This reduces the magnetostriction to almost zero, inhibiting a reproducing head from causing noise or output fluctuation due to stress-induced change in magnetic domain structure of the shield.

The present inventors have investigated the relationship between the thickness of the amorphous material layer of the lower magnetic shielding film and the reject ratio due to hysteretic jump, the MR ratio, and the grain size in the crystalline material layer of the lower magnetic shielding film. The test results are shown in Table 1. The term "reject ratio due to hysteretic jump" as used herein means a percent defective of MR elements inspected in the wafer process for the QST curve (which is a curve with output voltage in ordinate and external magnetic field in abscissa), wherein the MR element will be determined as a defective one if the QST curve is not linear but hysteretic. The magneto-resistive film was formed as follows: after a Ta layer and a Ru layer were deposited, an IrMn layer was deposited thereon as the antiferromagnetic layer, a CoFe/Ru/CoFe/CoMnSi layer was deposited on the antiferromagnetic layer as the pinned layer, a Cu layer was deposited on the pinned layer as the non-magnetic layer, a CoFe/NiFe/CoFe layer was deposited on the non-magnetic layer as the free layer, and a Ta layer was deposited on the free layer.

The lower magnetic shielding film had an overall thickness of 2.0 μm, wherein the amorphous material layer was a CoZrTaCr layer and the crystalline material layer was a NiFe layer. The annealing temperature was constant at 350° C. Table 1 shows the above relationship when the film thickness of the amorphous material layer (i.e., the CoZrTaCr layer) was changed variously.

TABLE 1

| Thickness [μm] of amorphous material layer (CoZrTaCr layer) | Reject ratio [reject %] due to hysteretic jump | MR ratio [%] | Grain size [μm] of crystalline material layer (NiFe layer) |
|---|---|---|---|
| 0 | 98 | 16 | 1200 |
| 0.2 | 64 | 15 | 990 |
| 0.5 | 9 | 14 | 821 |
| 0.8 | 5 | 16 | 700 |
| 1.0 | 5 | 15 | 532 |
| 1.2 | 6 | 13 | 149 |
| 1.5 | 2 | 12 | 94 |
| 1.8 | 0 | 6 | 65 |
| 2.0 | 0 | 7 | — |

As shown in Table 1, when the film thickness of the amorphous material layer (i.e., the CoZrTaCr layer) was less than 0.5 μm (i.e., one-quarter of 2.0 μm, which was the overall thickness of the lower magnetic shielding film), the reject ratio due to hysteretic jump was relatively large, but when the film thickness of the amorphous material layer (i.e., the CoZrTaCr layer) became equal to or greater than 0.5 μm (i.e., one-quarter of the overall thickness of the lower magnetic shielding film), the reject ratio due to hysteretic jump dramatically decreased. On the other hand, when the film thickness of the amorphous material layer (i.e., the CoZrTaCr layer) became greater than 1.5 μm (i.e., three-quarters of 2.0 μm, which was the overall thickness of the lower magnetic shielding film), the MR ratio sharply decreased, but when the film thickness of the amorphous material layer (i.e., the CoZrTaCr layer) was equal to or less than 1.5 μm (i.e., three-quarters of the overall thickness of the lower magnetic shielding film), the MR ratio was inhibited from decreasing and almost maintained.

The present inventors have also conducted the same test by changing the overall thickness of the lower magnetic shielding film. The test results are shown in Table 2. In the test of Table 2, the overall thickness of the lower magnetic shielding film was changed to 1.0 μm, but the structure of the magneto-resistive film, the materials of the lower magnetic shielding film, and the annealing temperature were the same as in the test of Table 1.

TABLE 2

| Thickness [μm] of amorphous material layer (CoZrTaCr layer) | Reject ratio [reject %] due to hysteretic jump | MR ratio [%] | Grain size [μm] of crystalline material layer (NiFe layer) |
|---|---|---|---|
| 0 | 75 | 16 | 1050 |
| 0.20 | 15 | 15 | 850 |
| 0.25 | 8 | 15 | 822 |
| 0.50 | 7 | 14 | 795 |
| 0.75 | 5 | 10 | 350 |
| 0.90 | 5 | 7 | 150 |
| 1.00 | 0 | 5 | — |

As shown in Table 2, when the film thickness of the amorphous material layer (i.e., the CoZrTaCr layer) was less than 0.25 μm (i.e., one-quarter of 1.0 μm, which was the overall thickness of the lower magnetic shielding film), the reject ratio due to hysteretic jump was relatively large, but when the film thickness of the amorphous material layer (i.e., the CoZrTaCr layer) became equal to or greater than 0.25 μm (i.e., one-quarter of the overall thickness of the lower magnetic shielding film), the reject ratio due to hysteretic jump dramatically decreased. On the other hand, when the film thickness of the amorphous material layer (i.e., the CoZrTaCr layer) became greater than 0.75 μm (i.e., three-quarters of 1.0 μm, which was the overall thickness of the lower magnetic shielding film), the MR ratio sharply decreased, but when the film thickness of the amorphous material layer (i.e., the CoZrTaCr layer) was equal to or less than 0.75 μm (i.e., three-quarters of the overall thickness of the lower magnetic shielding film), the MR ratio was inhibited from decreasing and almost maintained.

As understood from above, the CPP magneto-resistive element according to one embodiment of the present invention is excellent in both the magnetic shielding effect and the MR ratio.

Next will be described a magnetic head using the foregoing CPP magneto-resistive element as a read element according to one embodiment of the present invention.

Figure 2:
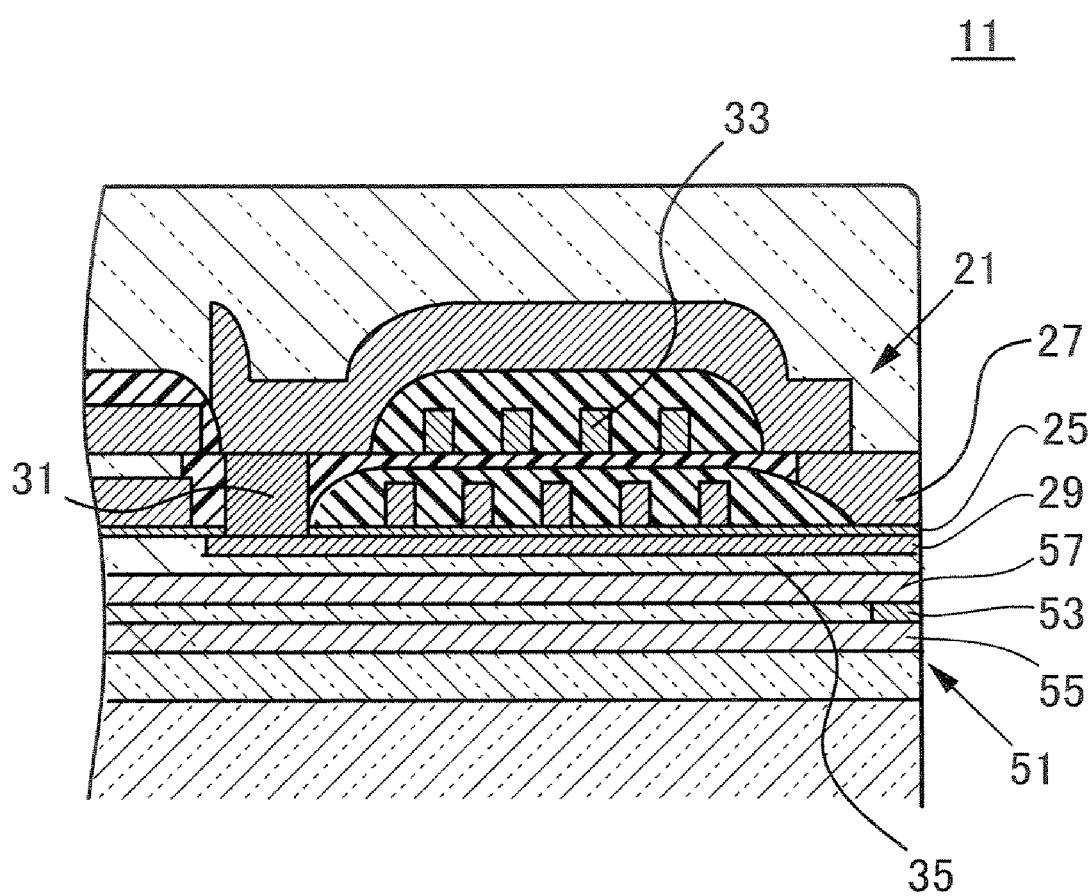
FIG. 2 is an enlarged sectional view showing a relevant portion of a magnetic head according to one embodiment of the present invention.

FIG. 2 is a sectional view showing an end of a magnetic head 11 on the medium-facing surface side. The magnetic head 11 includes a write element 21 and the CPP magneto-resistive element 51 as a read element.

The write element 21 has a gap film 25. Above and below the gap film 25, there are disposed upper and lower magnetic pole films 27 and 29. On the side opposite to the medium-facing surface, the upper and lower magnetic pole films 27 and 29 are connected to each other through a connecting portion 31, thereby forming a magnetic circuit. Between the upper and lower magnetic pole films 27 and 29, there is formed a coil 33. The coil 33 is disposed to wind around the connecting portion 31.

The CPP magneto-resistive element 51, which is a read element, is disposed below the write element 21 with a non-magnetic film 35 therebetween.

Next will be described a magnetic recording/reproducing apparatus using the foregoing magnetic head according to one embodiment of the present invention.

Figure 3:
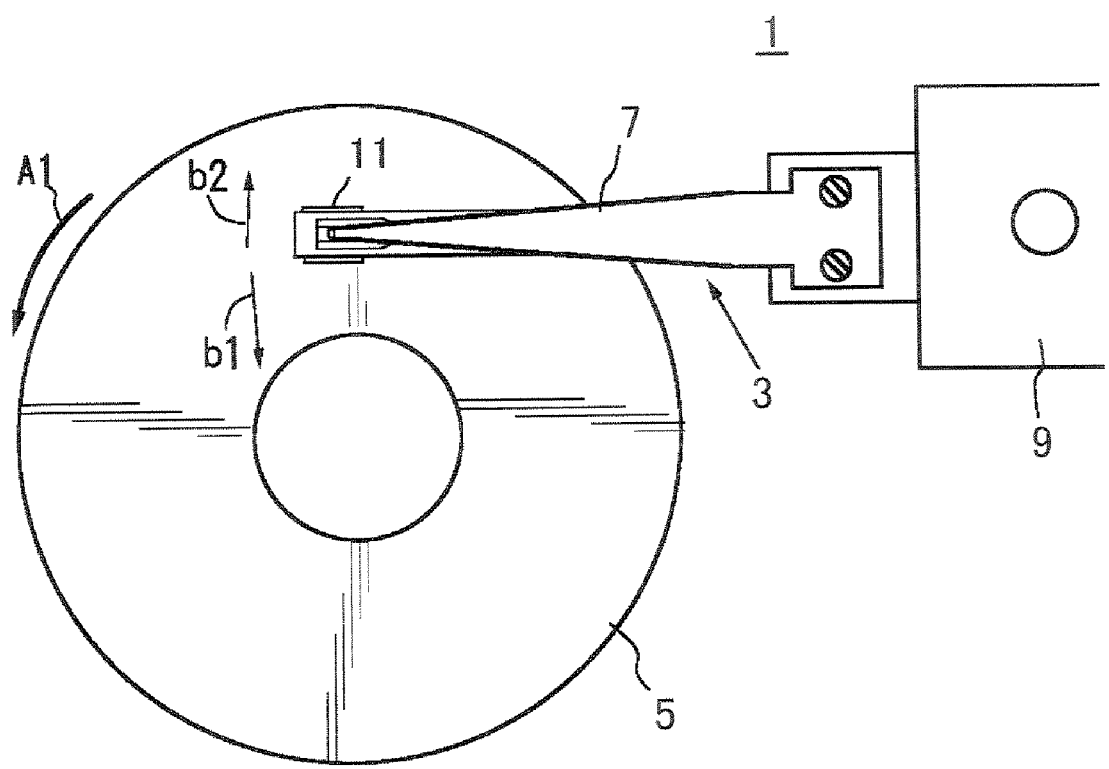
FIG. 3 is a diagram showing a magnetic recording/reproducing apparatus according to one embodiment of the present invention.

FIG. 3 is a plan view of a magnetic recording/reproducing apparatus 1. The illustrated magnetic recording/reproducing apparatus 1 includes a magnetic head device 3 and a magnetic disk 5. The magnetic head device 3 includes at least a head support device 7, a positioning device 9 and the magnetic head 11. One end of the head support device 7 is connected to the positioning device 9. The magnetic head 11 is supported by the other end of the head support device 7 to face a magnetic recording surface of the magnetic disk 5.

In the magnetic recording/reproducing apparatus 1 thus constructed, when the magnetic disk 5 is driven to rotate in the direction of arrow A1 by a driving mechanism (not shown), the magnetic head 11 flies over the surface of the magnetic disk 5 at a low flying height. When the positioning device 9 is driven, the magnetic head 11 is moved in the radial direction b1 or b2 of the magnetic disk 5 through the head support device 7, performing writing/reading of magnetic data in a specified track position on the magnetic disk 5.

While the present invention has been particularly shown and described with reference to embodiments thereof, it will be understood by those skilled in the art that various changes in form and detail may be made therein without departing from the spirit, scope and teaching of the invention.

For example, the present invention is not limited to the foregoing CPP-GMR element, but applicable to a variety of CPP magneto-resistive elements whose magnetic shielding film functions not only as a magnetic shield but also as an electrode to feed current. For example, the present invention may be embodied in a TMR element. In this case, the foregoing non-magnetic layer will be constituted of a material which requires high-temperature annealing to improve the MR ratio, such as MgO (crystalline magnesium oxide), and function as a tunnel barrier layer. Also in this case, the presence of the amorphous material ensures sufficient shielding effect, while suppressing the grain growth of the crystalline material within the lower magnetic shielding film at a high annealing temperature. In addition, since the high-temperature annealing provides proper grain growth of the crystalline material within the crystalline material layer, a highly resistive grain boundary decreases in the shield, which achieves a decrease in the parasitic resistance at the electrodes.

Furthermore, the present invention is not limited to the application in the foregoing longitudinal magnetic recording system, but also applicable to the perpendicular magnetic recording system.

What is claimed is:

1. A current-perpendicular-to-plane magneto-resistive element comprising:
   a magneto-resistive film; and
   a pair of upper and lower magnetic shielding films holding said magneto-resistive film therebetween for current feeding, wherein
   said lower magnetic shielding film has an at least two-layer structure including a crystalline material layer and an amorphous material layer disposed below said crystalline material layer, and
   a crystalline material of said crystalline material layer has a grain size of 90 nm to 850 nm.

2. The current-perpendicular-to-plane magneto-resistive element of claim 1, wherein the crystalline material of said crystalline material layer is either $Ni_xFe_{(1-x)}$ (75<x<85[at.%]) or $Co_yFe_{(1-y)}$ (5<y<15[at.%]).

3. A magnetic head comprising the current-perpendicular-to-plane magneto-resistive element of claim 1 as a read element.

4. A magnetic recording/reproducing apparatus comprising the magnetic head of claim 3 and a magnetic recording medium.

5. A current-perpendicular-to-plane magneto-resistive element comprising:
   a magneto-resistive film; and
   a pair of upper and lower magnetic shielding films holding said magneto-resistive film therebetween for current feeding, wherein
   said lower magnetic shielding film has an at least two-layer structure including a crystalline material layer and an amorphous material layer disposed below said crystalline material layer, and
   said amorphous material layer has a film thickness as large as one-quarter to three-quarters of a film thickness of said lower magnetic shielding film.

6. The current-perpendicular-to-plane magneto-resistive element of claim 5, wherein the crystalline material of said crystalline material layer is either $Ni_xFe_{(1-x)}$ (75<x<85[at.%]) or $Co_yFe_{(1-y)}$ (5<y<15[at.%]).

7. A magnetic head comprising the current-perpendicular-to-plane magneto-resistive element of claim 5 as a read element.

8. A magnetic recording/reproducing apparatus comprising the magnetic head of claim 7 and a magnetic recording medium.

9. A current-perpendicular-to-plane magneto-resistive element comprising:
   a magneto-resistive film; and
   a pair of upper and lower magnetic shielding films holding said magneto-resistive film therebetween for current feeding, wherein said lower magnetic shielding film has an at least two-layer structure including a crystalline material layer and an amorphous material layer disposed below said crystalline material layer, and a crystalline material of said crystalline material layer comprises at least one element selected from the group consisting of Fe, Ni and Co, and further comprises at least C, S and B as trace elements, while an amorphous material of said amorphous material layer is a magnetic material and comprises at least one element selected from the group consisting of Co, Fe, Zr, Ta, Mo, Ni, Cu, Si, Hf, Nb, W, Cr, Al, P, V, C, B, O and N.

10. The current-perpendicular-to-plane magneto-resistive element of claim 9, wherein the crystalline material of said crystalline material layer is either $Ni_xFe_{(1-x)}$ (75<x<85[at.%]) or $Co_yFe_{(1-y)}$ (5<y<15[at.%]).

11. A magnetic head comprising the current-perpendicular-to-plane magneto-resistive element of claim 9 as a read element.

12. A magnetic recording/reproducing apparatus comprising the magnetic head of claim 11 and a magnetic recording medium.

* * * * *